United States Patent
Aoki et al.

(10) Patent No.: US 6,840,889 B2
(45) Date of Patent: Jan. 11, 2005

(54) CONTROL DEVICE FOR VEHICLE (75) Inventors: Takashi Aoki, Saitama (JP); Kazuhiko Kitano, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/376,459

(22) Filed: Mar. 3, 2003

(65) Prior Publication Data

US 2003/0171187 A1 Sep. 11, 2003

(30) Foreign Application Priority Data

Mar. 8, 2002 (JP) ........................................ 2002-064443

(51) Int. Cl.$^7$ ................................................ B60K 6/02
(52) U.S. Cl. ........................ 477/156; 477/157; 477/902
(58) Field of Search .............................. 477/3, 54, 156, 477/157, 158, 902, 107

(56) References Cited

U.S. PATENT DOCUMENTS

| | | | | |
|---|---|---|---|---|
| 6,386,170 B1 | * | 5/2002 | Iwano et al. | 123/196 R |
| 6,390,947 B1 | * | 5/2002 | Aoki et al. | 477/3 |
| 6,638,022 B2 | * | 10/2003 | Shimabukuro et al. | 417/2 |
| 6,647,326 B2 | * | 11/2003 | Nakamori et al. | 477/158 |
| 6,692,402 B2 | * | 2/2004 | Nakamori et al. | 477/3 |
| 6,716,138 B2 | * | 4/2004 | Matsubara et al. | 477/167 |

FOREIGN PATENT DOCUMENTS

JP 2001-99282 4/2001

* cited by examiner

Primary Examiner—Sherry Estremsky
(74) Attorney, Agent, or Firm—Westerman, Hattori, Daniels & Adrian, LLP (57) ABSTRACT

A control device for a vehicle controls a motor-driven pump at an appropriate timing when an internal combustion engine is stopped or starts. An ECU of the control device comprises an operation determination section which determines whether or not the motor-driven pump is operated depending on the value of an idling stop flag that makes the internal combustion engine stop, depending on a measured value output from an oil pressure sensor for measuring oil pressure in oil lines providing operation oil to a torque converter and a transmission, and depending on a measured value output from an oil temperature sensor for measuring the temperature of the operation oil; and a target electrical current calculation section for calculating a target value of electrical current to be supplied during the operation of the motor-driven oil pump depending on the determination result by the operation determination section. The target electrical current calculated by the target electrical current calculation section is input to a driving section of the motor-driven oil pump, and the driving section provides driving electrical power to the pump depending on the target electrical current.

6 Claims, 7 Drawing Sheets

CONTROL DEVICE FOR VEHICLE

BACKGROUND OF THE INVENTION

1. Field of the Invention

The present invention relates to a control device for a vehicle which comprises an automatic transmission, and in which an idling operation is stopped depending on predetermined stopping conditions, and in particular, the present invention relates to a control device incorporating a control technique which controls a motor-driven oil pump providing oil pressure for controllably operating the automatic transmission when the vehicle is in an idling stopped mode.

2. Description of the Related Art

An oil pressure control device, such as disclosed in Japanese Unexamined Patent Application, First Publication No. 2001-99282, has been known in the art, which comprises a motor-driven oil pump in addition to a mechanical oil pump providing oil pressure for controllably operating a transmission or the like, and which controls the motor-driven oil pump so as to start the motor-driven oil pump upon receiving an engine stopping command and to stop the motor-driven oil pump upon receiving an engine restarting command.

In such oil pressure control devices, the motor-driven oil pump is constructed so as to be driven by being supplied electrical power from a battery device when the engine for driving the mechanical oil pump is stopped, and so as to provide oil pressure for controllably operating the transmission when, for example, the vehicle is going to start.

In such conventional oil pressure control devices, the motor-driven oil pump may not be operated or stopped at an appropriate timing if the motor-driven oil pump is controlled so as to be operated or stopped only by the engine stopping command or engine restarting command.

For example, if operation oil is evacuated from oil lines when the motor-driven oil pump is started after the engine and mechanical oil pump are stopped, it is necessary to set oil pressure to be at a predetermined standby pressure after filling the oil lines with the operation oil first in order to improve the responsiveness of the transmission at starting of the vehicle. To complete such operations in a short period, high capacity and high electrical power consumption of the motor-driven oil pump are required. As a result, problems are encountered in that efficiency of the motor-driven oil pump is lowered due increase in heat generation, or installability of the motor-driven oil pump in the vehicle is degraded due to increased size thereof.

On the other hand, if the motor-driven oil pump is started when, for example, oil pressure in the oil lines is relatively high upon receiving an engine stopping command, a problem is encountered in that efficiency of the motor-driven oil pump is lowered due to excessively increased oil pressure and electrical power consumption.

Moreover, if the motor-driven oil pump is stopped when, for example, discharging pressure of the mechanical pump is relatively low upon receiving an engine restarting command, oil pressure may be decreased, and responsiveness of vehicle at starting may be degraded. In contrast, if the motor-driven oil pump is stopped too late, a problem is encountered in that efficiency of the motor-driven oil pump is lowered due to excessively increased oil pressure and electrical power consumption.

SUMMARY OF THE INVENTION

In consideration of the above circumstances, an object of the present invention is to provide a control device a control device for a vehicle comprising: a transmission which connects an input shaft connected to an internal combustion engine to an output shaft connected to driving wheels in such a manner that transmission gear ratio therebetween is changeable, and so as to transmit driving power of the internal combustion engine to the driving wheels; an oil pump driven by the internal combustion engine; a motor-driven oil pump which is provided independently from the oil pump, and which is driven by being supplied electrical power from an electrical power source; an oil pressure providing section which provides oil pressure for controllably operating the transmission by using operation oil supplied from the oil pump and motor-driven oil pump; an oil pressure measuring section for measuring the oil pressure provided by the oil pressure providing section; an engine stopping command output section for outputting an engine stopping command which makes the internal combustion engine stop upon predetermined stop conditions; and a control section for controlling the operation of the motor-driven oil pump depending on the engine stopping command output from the engine stopping command output section and depending on the measured oil pressure output from the oil pressure measuring section.

According to the above control device for a vehicle, because the control section controls the operation of the motor-driven oil pump depending on the engine stopping command output from the engine stopping command output section and depending on the measured oil pressure output from the oil pressure measuring section, the oil pressure provided by the oil pressure providing section can be maintained to be an appropriate value while improving the operational efficiency of the motor-driven oil pump; therefore, degradation of the responsiveness of the vehicle at starting can be prevented, and the vehicle can be smoothly started.

The control device of the present invention may further comprise an oil temperature measuring section for measuring the temperature of the operation oil supplied from the oil pressure providing section, and the control section may control the operation of the motor-driven oil pump depending on the temperature of the operation oil output from the oil temperature measuring section.

According to the above control device, the control section controls the operation of the motor-driven oil pump depending on the engine stopping command output from the engine stopping command output section, depending on the measured oil pressure output from the oil pressure measuring section, and depending on the temperature of the operation oil output from the oil temperature measuring section. For example, when the temperature of the operation oil is relatively high, the revolution rate of the motor-driven oil pump is set to be high as it is determined that the discharge pressure of the motor-driven oil pump may be decreased. In contrast, when the temperature of the operation oil is relatively low, the revolution rate of the motor-driven oil pump is set to be low as it is determined that decrease in the discharge pressure of the motor-driven oil pump is small.

As a result, accuracy of the oil pressure provided by the operation of the motor-driven oil pump can be improved, and the oil pressure provided by the oil pressure providing section can be maintained to be an appropriate value while improving the efficiency of the motor-driven oil pump; therefore, degradation of the responsiveness of the vehicle at starting can be prevented, and the vehicle can be smoothly started.

In the control device of the present invention, the control section may make the motor-driven oil pump start when the measured oil pressure output from the oil pressure measuring section is equal to or smaller than a predetermined starting threshold value after the engine stopping command is output from the engine stopping command output section.

According to the above control device, if compared with a control device which operates a motor-driven oil pump merely depending on an engine stopping command output from an engine stopping command output section, the oil pressure provided by the oil pressure providing section can be maintained to be an appropriate value while improving the efficiency of the motor-driven oil pump; therefore, degradation of the responsiveness of the vehicle at starting can be prevented, and the vehicle can be smoothly started.

The control device of the present invention may further comprise an engine starting command output section for outputting an engine starting command which makes the internal combustion engine start upon predetermined start conditions, and the control section may make the motor-driven oil pump stop when the measured oil pressure output from the oil pressure measuring section is equal to or greater than a predetermined stopping threshold value after the engine starting command is output from the engine starting command output section.

According to the above control device, if compared with a control device which operates a motor-driven oil pump merely depending on an engine stopping command output from an engine stopping command output section, the oil pressure provided by the oil pressure providing section can be maintained to be an appropriate value while improving the efficiency of the motor-driven oil pump; therefore, degradation of the responsiveness of the vehicle at starting can be prevented, and the vehicle can be smoothly started.

In the control device of the present invention, the control section may control the motor-driven oil pump so that the oil pressure measuring section outputs oil pressure greater than a predetermined oil pressure which is required to set the transmission in a state in which the input shaft and the output shaft is about to be connected.

According to the above control device, oil pressure, which is equivalent to oil pressure required to set the transmission in a state in which the input shaft and the output shaft is about to be connected, can be provided by the operation of the motor-driven oil pump even when the oil pump is stopped due to stop of the internal combustion engine; therefore, degradation of the responsiveness of the vehicle at starting can be prevented, and the vehicle can be smoothly started.

DESCRIPTION OF THE PREFERRED EMBODIMENTS

An embodiment of the control device for a vehicle according to the present invention will be explained below with reference to the appended drawings.

Figure 1:
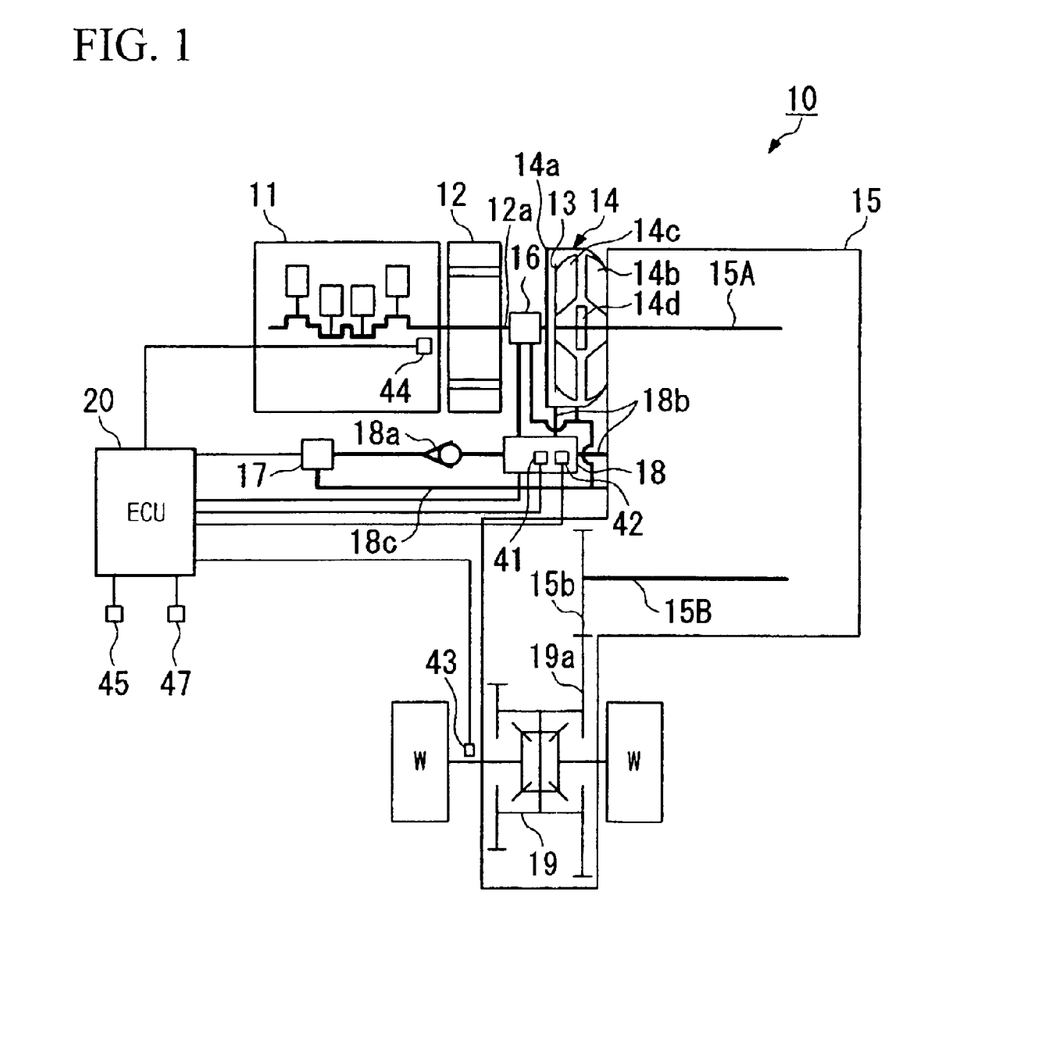
FIG. 1 is an explanatory diagram showing the main part of the general structure of a hybrid vehicle having a control device for a vehicle in an embodiment according to the present invention.
Figure 2:
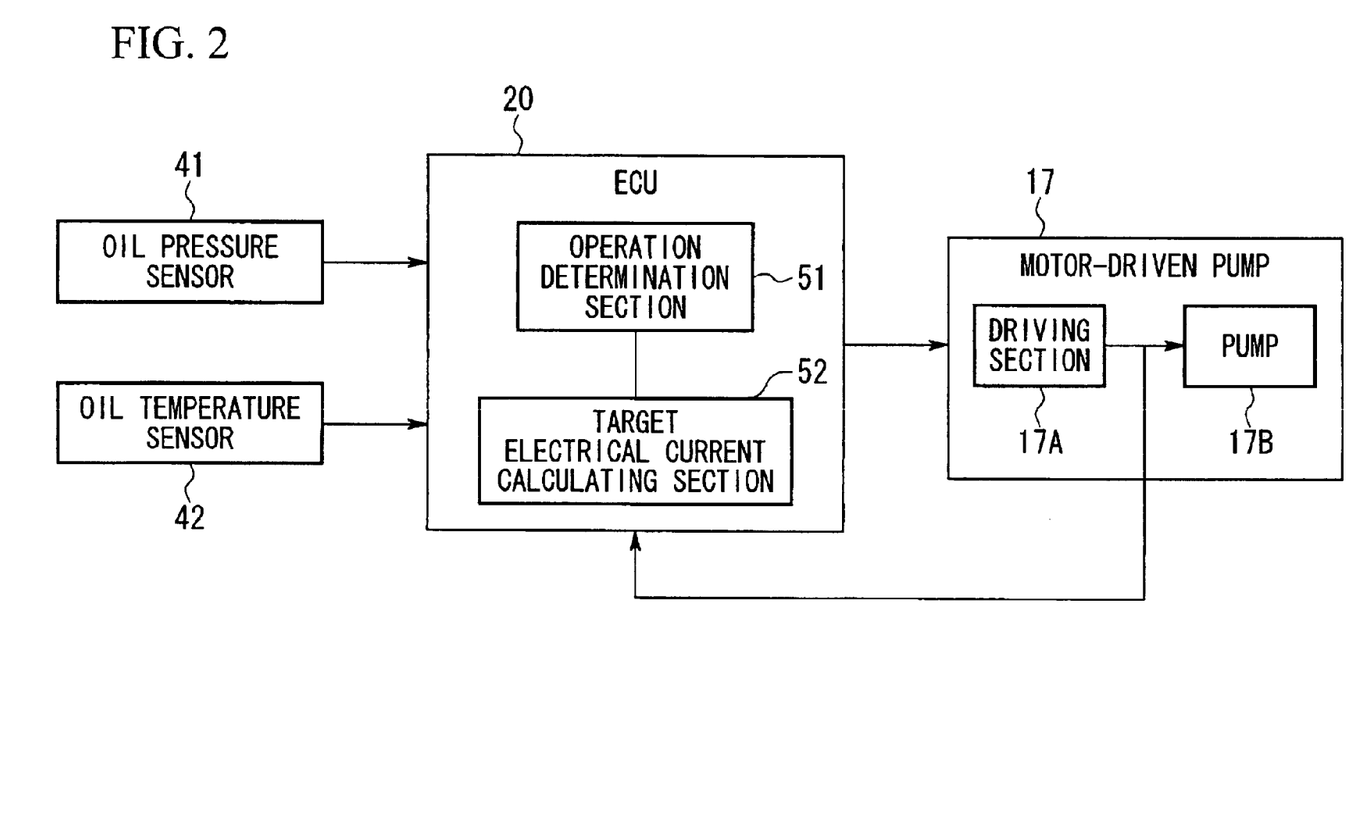
FIG. 2 is a functional block diagram showing the main part of the control device for a vehicle shown in FIG. 1.

FIG. 1 is an explanatory diagram showing the main part of the general structure of a hybrid vehicle having the control device 10 for a vehicle in an embodiment according to the present invention, and FIG. 2 is a functional block diagram showing the main part of the control device 10 for a vehicle shown in FIG. 1.

The control device 10 for a hybrid vehicle in this embodiment transmits the driving power of at least one of an internal combustion engine 11 and a motor 12 to the drive wheels W and W of the vehicle via a torque converter 14 and via a transmission 15, and the control device 10 comprises the internal combustion engine 11 and the motor 12 connected in series with respect to each other, the torque converter 14 connected to the rotational axis 12a of the motor 12, the transmission 15, a mechanical oil pump 16 and a motor-driven oil pump 17 producing oil pressure for controllably operating the torque converter 14 and the transmission 15, an oil pressure providing section 18, a differential gear device 19 for distributing the driving power to the right and left driving wheels W and W, and an ECU 20.

The torque converter 14 transmits torque using fluid, and the torque converter 14 comprises a pump impeller 14b integrated with a front cover 14a connected to the rotational axis 12a of the motor 12, a turbine runner 14c disposed between the front cover 14a and the pump impeller 14b so as to face the pump impeller 14b, and a stator 4d disposed between the pump impeller 14b and the turbine runner 14c.

Furthermore, a lockup clutch 13 is disposed between the turbine runner 14c and the front cover 14a so as to be pressed against the inner surface of the front cover 14a and so as to be able to engage the front cover 14a.

In addition, operation oil (ATF: Automatic Transmission Fluid) is filled in a chamber formed by the front cover 14a and the pump impeller 14b.

When the pump impeller 14b rotates along with the front cover 14a in a state in which the lockup clutch 13 is disengaged, the helical flow of the operation oil is produced, which makes the turbine runner 14c to produce rotational driving power; thus, torque is transmitted via the operation oil.

On the other hand, when the lockup clutch 13 is in an engaged state, the rotational driving power is directly transmitted from the front cover 14a to the turbine runner 14c without the operation oil intervening.

Note that because the engaging state of the lockup clutch 13 is set to be variable, the rotational driving power transmitted from the front cover 14a to the turbine runner 14c via the lockup clutch 13 can be freely set.

The transmission 15 is an automatic transmission of the type in which speed change operation is controlled by, for example, the ECU 20 in such a way that an input shaft 15A as an main shaft and an output shaft 15B as a counter shaft are connected so that gear ratio is selected stepwise.

Note that a connecting gear 15b integrated with the output shaft 15B of the transmission 15 is provided so as to continuously mesh with the gear 19a of the differential gear device 19 which distributes the driving power to the right and left driving wheels W and W, respectively.

Because the oil pump 16 is driven via a pump drive gear spline-engaged with a pump shaft of the torque converter 14 which is directly connected to the rotational axis 12$a$ of the motor 12 which is, for example, connected to the internal combustion engine 11, the oil pump 16 can be operated synchronously with the engine revolution rate NE. The oil pump 16 is driven by the output power of the internal combustion engine 11 when the motor 12 is operated in a regenerative mode, or the motor 12 is stopped. Oil lines of the oil pump 16 are connected to the oil pressure providing section 18.

The motor-driven oil pump 17 is operated by being supplied electrical power from a battery device (not shown), oil lines of the motor-driven oil pump 17 are connected to the oil pressure providing section 18 via a check valve 18$a$.

The oil pressure providing section 18 comprising, for example, pressure and flow rate control valve, etc., is controlled by the ECU 20 so as to provide oil pressure for controllably operating the torque converter 14, transmission 15, etc.

Moreover, the oil pressure providing section 18 further comprises an oil pressure sensor 41 for measuring oil pressure in oil lines 18$b$ (oil line pressure) which provides the operation oil to the torque converter 14, transmission 15, etc., an oil temperature sensor 42 for measuring the temperature of the operation oil (oil temperature) flowing through the oil lines 18$b$. The measured signals output from the sensors 41 and 42 are input to the ECU 20.

The operation oil discharged from the torque converter 14 and transmission 15 is supplied to the oil pump 16 and motor-driven oil pump 17 via a discharge oil line 18$c$.

The ECU 20 controls, for example, the operation of the lockup clutch 13 and the gear shift operation of the transmission 15 depending on, for example, the shift operation input by the driver, or depending on the driving state of the vehicle.

Furthermore, the ECU 20 also controls the operation of the motor-driven oil pump 17 depending on operation state or stopped state of the internal combustion engine 11, and depending on the oil line pressure or oil temperature, which will be explained below.

In order to execute various control operations, the ECU 20 is provided various signals such as a signal output from a vehicle speed sensor 43 which measures vehicle speed V based on the rotational speed of the drive wheels W, a signal output from a revolution rate sensor 44 which measures the revolution rate of the internal combustion engine 11 (engine revolution rate) NE, a signal from a brake pedal switch 45 which detects operation of the brake pedal (not shown) by the driver, a signal from an accelerator pedal opening degree sensor 47 which detects operation of the accelerator pedal (not shown) by the driver.

As shown in FIG. 2, the ECU 20 comprises, for example, an operation determination section 51 for determining whether the motor-driven oil pump 17 should be operated or not based on a flag value of idling stop flag making the internal combustion engine 11 stop and based on measured signals output from the oil pressure sensor 41 and the oil temperature sensor 42, and a target electrical current calculating section 52 for calculating the target value of electrical current (target electrical current IEOP) to be supplied during the operation of the motor-driven oil pump 17 depending on the determination result by the operation determination section 51.

The target electrical current IEOP calculated by the target electrical current calculating section 52 is input to a driving section 17A of the motor-driven oil pump 17, and the driving section 17A supplies electrical current corresponding to the target electrical current IEOP to a pump 17B comprising a motor for driving the pump so as to drive the pump 17B.

The actual electrical current value of the driving electrical current supplied from the driving section 17A to the pump 17B is input to the target electrical current calculating section 52 of the ECU 20, and the target electrical current calculating section 52 executes a feedback control operation so that the deviation between the calculated target electrical current IEOP and the actual electrical current value of the driving electrical current is equal to zero by performing, for example, proportion and integration operation as will be further explained below.

The control device 10 for a vehicle in this embodiment is constructed as explained above. Next, the operation of the control device 10 for a vehicle, specifically, the operation for controlling the motor-driven oil pump 17 when the internal combustion engine 11 is in an idling stopped state will be explained below with reference to the appended drawings.

Figure 3:
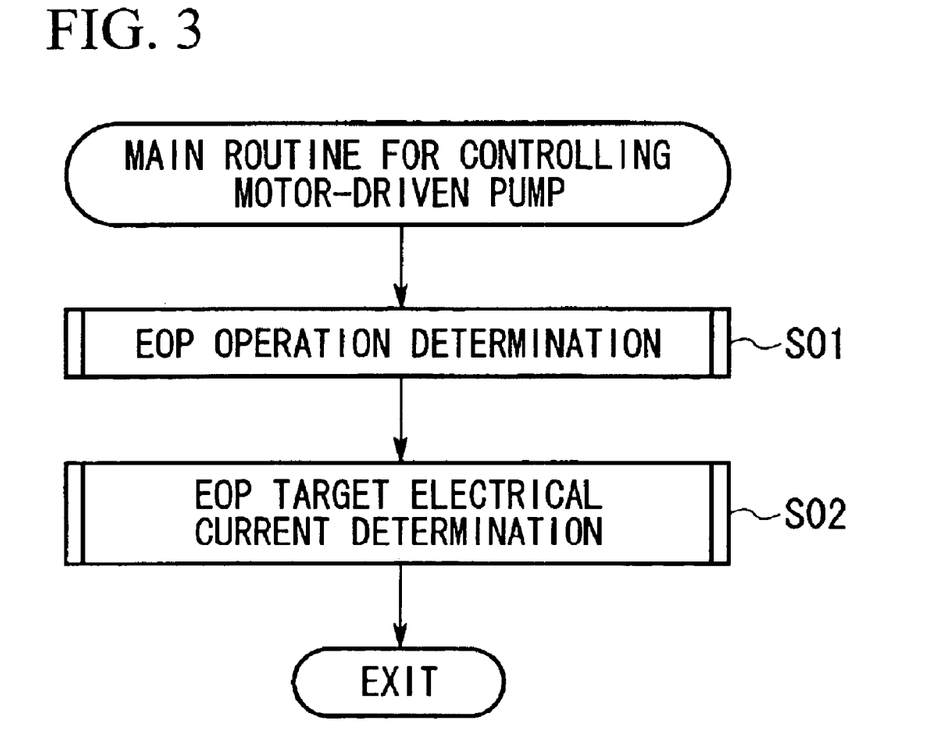
FIG. 3 is a flowchart showing the operation of the control device for a vehicle, in particular, showing the control operation for a motor-driven oil pump.
Figure 4:
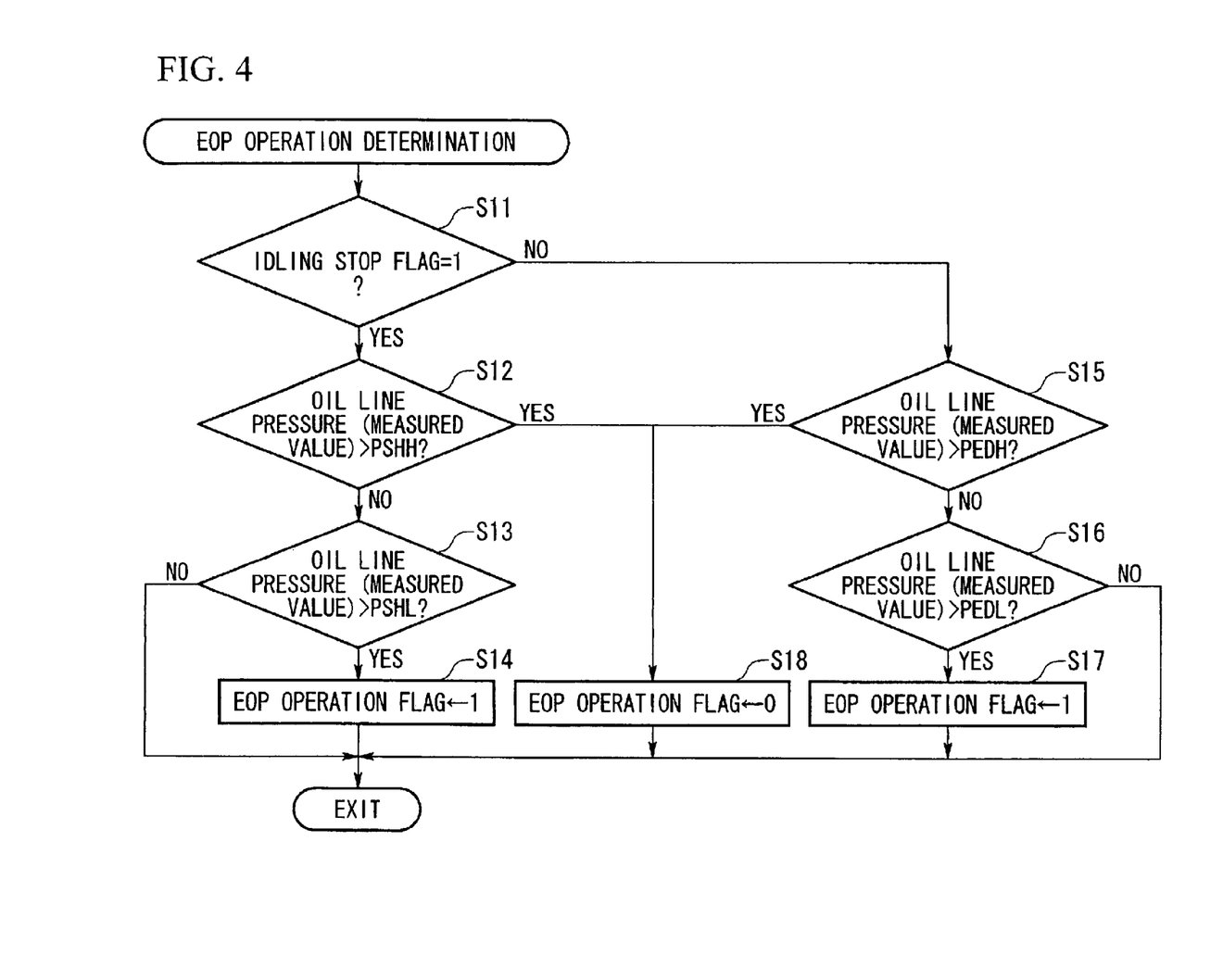
FIG. 4 is a flowchart showing the procedure for determining the operation of the motor-driven oil pump.
Figure 5:
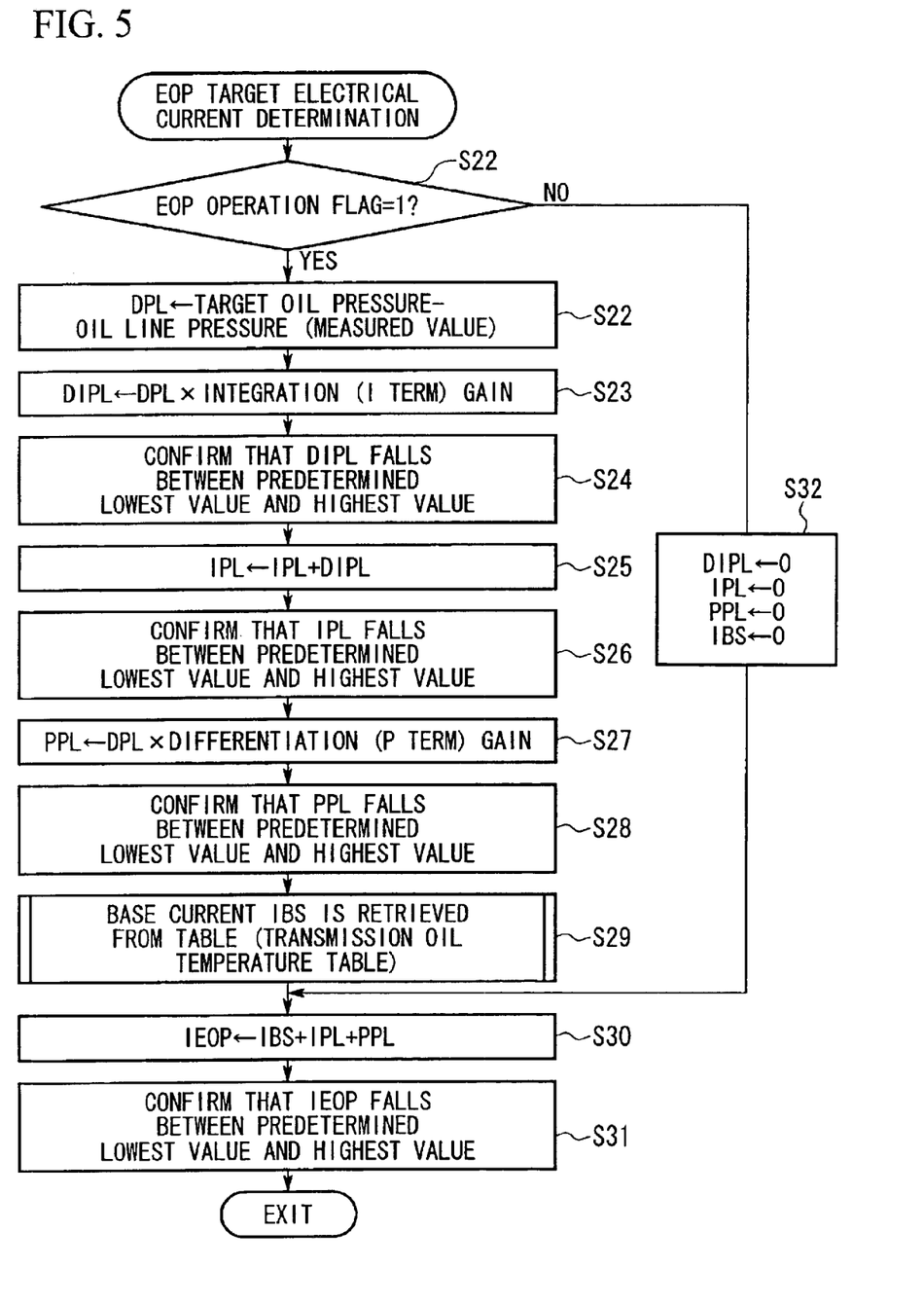
FIG. 5 is a flowchart showing the procedure for calculating a target electrical current shown in FIG. 3.
Figure 6:
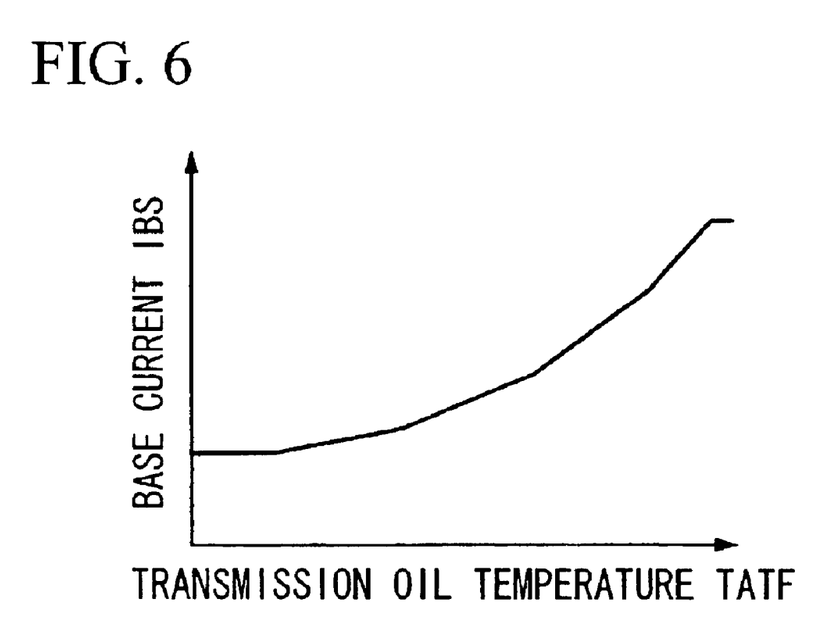
FIG. 6 is a graph showing a change in a base electrical current IBS depending on an oil temperature TATF.

FIG. 3 is a flowchart showing the operation of the control device 10 for a vehicle, in particular, showing the control operation of the motor-driven oil pump 17, FIG. 4 is a flowchart showing the procedure for determining the operation of the motor-driven oil pump 17, FIG. 5 is a flowchart showing the procedure for calculating the target electrical current shown in FIG. 3, FIG. 6 is a graph showing a change in the base electrical current IBS depending on the oil temperature TATF, and FIGS. 7A to 7F are graphs respectively showing examples of time-domain changes in the vehicle speed V, the engine revolution rate NE, the motor-driven oil pump operation flag, the idling stop flag, the oil line pressure, and the clutch pressure.

First, in step S01 shown in FIG. 3, an operation for determining the operation of the motor-driven oil pump 17 (EOP operation determination), which will be further explained below, is executed.

In step S02, as will be further explained below, the target electrical current is calculated (i.e., EOP target electrical current is determined), and then the series of operations is terminated.

Next, the operation for the EOP operation determination in step S01 will be explained below with reference to FIG. 4.

First, in step S11 shown in FIG. 4, it is determined whether the value of the idling stop flag, which makes the internal combustion engine 11 stop, has been set to "1".

When the result of the determination is "NO", the operation proceeds to step S15.

In contrast, when the result of the determination is "YES", the operation proceeds to step S12.

In step S12, it is determined whether the oil line pressure measured by the oil pressure sensor 41 is greater than a high side threshold PSHH in predetermined operation-starting threshold values PSH.

When the result of the determination is "YES", the operation proceeds to step S18, which will be explained below.

In contrast, when the result of the determination is "NO", the operation proceeds to step S13, in which it is determined whether the oil line pressure measured by the oil pressure sensor 41 is smaller than a low side threshold PSHL in the predetermined operation-starting threshold values PSH.

When the result of the determination in step S13 is "NO", the series of operations is terminated.

In contrast, when the result of the determination in step S13 is "YES", the operation proceeds to step S14, in which the value of an EOP operation flag, which makes the motor-driven oil pump 17 operate, is set to "1", and then the series of operations is terminated.

In step S15, it is determined whether the oil line pressure measured by the oil pressure sensor 41 is greater than a high side threshold PEDH in predetermined operation-stopping threshold values PED.

When the result of the determination is "YES", the operation proceeds to step S18, which will be explained below.

In contrast, when the result of the determination is "NO", the operation proceeds to step S16, in which it is determined whether the oil line pressure measured by the oil pressure sensor 41 is less than a low side threshold PEDL in the predetermined operation-stopping threshold values PED.

When the result of the determination in step S16 is "NO", the series of operations is terminated.

In contrast, when the result of the determination in step S16 is "YES", the operation proceeds to step S17, in which the value of the EOP operation flag, which makes the motor-driven oil pump 17 operate, is set to "0", and then the series of operations is terminated.

As explained above, the motor-driven oil pump 17 is started when the oil line pressure is decreased to be equal to or smaller than the operation-starting threshold PSH having some hysteresis after a command requesting an idling stop is output, the motor-driven oil pump 17 is stopped when the oil line pressure is increased to be equal to or greater than the operation-stopping threshold PED having some hysteresis after a command requesting restart of the internal combustion engine 11 is output.

Next, the operation in step S02 for determining the EOP target electrical current will be explained below with reference to FIGS. 5 and 6.

First, in step 21 shown in FIG. 5, it is determined whether the value of the EOP operation flag, which makes the motor-driven oil pump 17 operate, has been set to "1".

When the result of the determination is "NO", the operation proceeds to step S32.

In contrast, when the result of the determination is "YES", the operation proceeds to step S22, in which a value, which is obtained by subtracting the oil line pressure measured by the oil pressure sensor 41 from a target oil pressure, i.e., a target value of oil pressure in the oil passage 18b which provides the operation oil to the torque converter 14, transmission 15, and the like, is set as an oil pressure deviation DPL.

In step S23, a value, which is obtained by multiplying the oil pressure deviation DPL by an integration gain, is set as an oil pressure deviation integration term DIPL.

In step S24, it is confirmed that the oil pressure deviation integration term DIPL falls between a predetermined highest value and a predetermined lowest value, and then the operation proceeds to step S25.

In step S25, a value, which is obtained by adding the oil pressure deviation integration term DIPL to an oil pressure integration term IPL is set as a renewed oil pressure integration term IPL.

In step S26, it is confirmed that the oil pressure integration term IPL falls between a predetermined highest value and a predetermined lowest value, and then the operation proceeds to step S27.

In step S27, a value, which is obtained by multiplying the oil pressure deviation DPL by a differentiation gain, is set as an oil pressure differentiation term PPL.

In step S28, it is confirmed that the oil pressure differentiation term PPL falls between a predetermined highest value and a predetermined lowest value, and then the operation proceeds to step S29.

In step 29, a base current IBS is determined by retrieving from a table, in which the base current IBS is increased as the oil temperature (the temperature of the transmission oil) TATF increases as shown, for example, in FIG. 6, depending on the oil temperature measured by the oil temperature sensor 42.

In step S30, the target electrical current IEOP is calculated by adding the oil pressure integration term IPL and the oil pressure differentiation term PPL to the retrieved base current IBS.

In step S31, it is confirmed that the target electrical current IEOP falls between a predetermined highest value and a predetermined lowest value, and the series of operations is terminated.

On the other hand, in step S32, "0" is set to the oil pressure deviation integration term DIPL, to the oil pressure integration term IPL, to the oil pressure differentiation term PPL, and to the base current IBS for initialization, and then the operation proceeds to step S30 explained above.

More specifically, the ECU 20 controls the operation of the motor-driven oil pump 17 depending on the value of the idling stop flag which makes the internal combustion engine 11 stop, depending on the oil line pressure measured by the oil pressure sensor 41, and depending on the oil temperature TATF measured by the oil temperature sensor 42. When the oil temperature TATF is relatively high, the ECU 20 increases the revolution rate of the motor-driven oil pump 17 by setting the base current IBS to be relatively high value upon determining that the discharging pressure of the motor-driven oil pump 17 will decrease. On the other hand, when the oil temperature TATF is relatively low, the ECU 20 decreases the revolution rate of the motor-driven oil pump 17 by setting the base current IBS to be a relatively low value upon determining that a decrease in the discharging pressure of the motor-driven oil pump 17 is relatively small.

As a result, accuracy of the oil line pressure produced by the operation of the motor-driven oil pump 17 can be improved, and the oil pressure provided by the oil pressure providing section 18 can be maintained at an appropriate level while improving the operational efficiency of the motor-driven oil pump 17; therefore, degradation of the responsiveness of the vehicle at starting can be prevented.

Figure 7A:
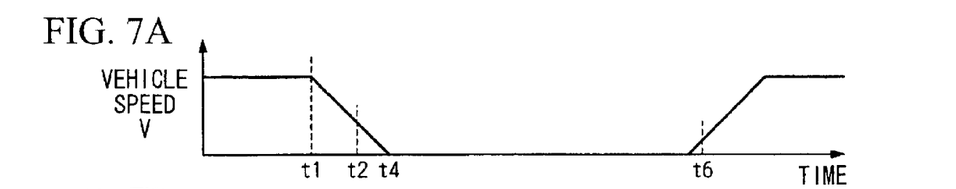
FIGS. 7A to 7F are graphs respectively showing examples of changes in a vehicle speed V, an engine revolution rate NE, a motor-driven oil pump operation flag, an idling stop flag, an oil line pressure, and a clutch pressure.
Figure 7B:
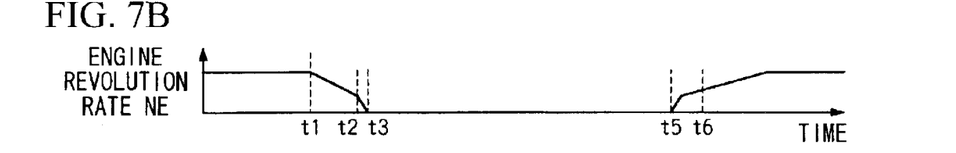
Figure 7C:
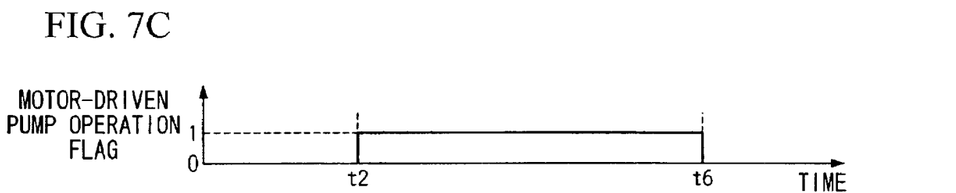
Figure 7D:
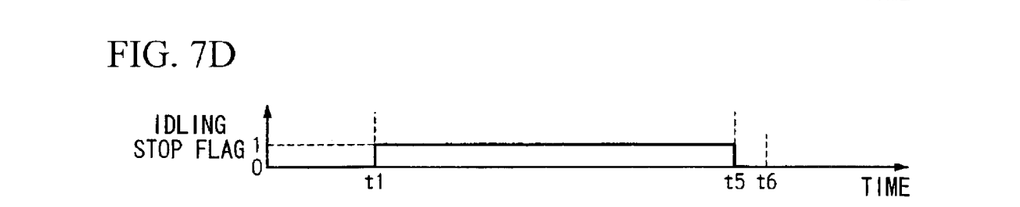

For example, if the flag value of the idling stop flag is set to "1" at time t1 as shown in FIG. 7D, the engine revolution rate NE decreases as shown in FIG. 7B. As a result, as shown in FIGS. 7E and 7F, the oil line pressure and the clutch pressure are decreased, i.e., the oil pressure provided to the clutch enabling the gear change operation of the transmission 15 is decreased.

Figure 7E:
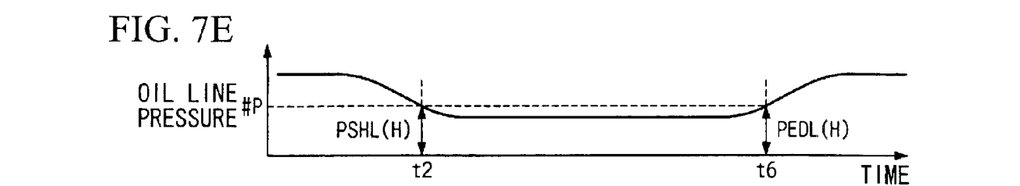

At time t2 at which the oil line pressure measured by the oil pressure sensor 41 decreases to be equal to or less than the predetermined operation-starting threshold value PSH having hysteresis as shown in FIG. 7E, "1" is set to the flag value of the EOP operation flag which makes the motor-driven oil pump operate, as shown in FIG. 7C.

Figure 7F:
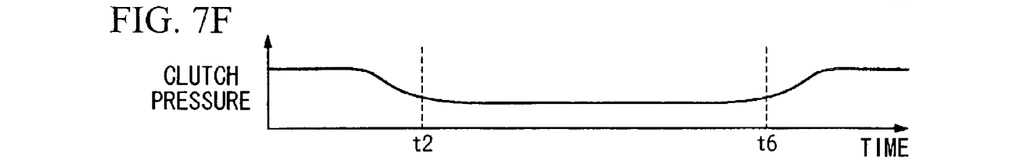

As a result, after time t2, even at time t3 at which the engine revolution rate NE falls to "0" as shown in FIG. 7B, the oil line pressure and the clutch pressure do not fall to "0", and are maintained at predetermined levels as shown in FIGS. 7E and 7F.

The flag value of the idling stop flag is set to "1" on condition that the present state of charge of the battery device is greater than a predetermined state of charge with which the internal combustion engine 11 can be restarted.

In an exemplary embodiment, the predetermined oil line pressure, which is provided by the operation of the motor-driven oil pump 17 when the engine is in the idling stopped state, is set so that a state in which non-operative stroke is eliminated is maintained. In a state in which non-operative stroke is eliminated, the piston chamber of a hydraulic actuator, which operates the clutch for the gear change operation, is filled with the operation oil, whereby each of clutch plates forming the clutch is made to be about to engage (i.e., the piston is moved to a position at which the clutch is about to be engaged), in order, for example, to improve the responsiveness of the clutch, which enables the gear change operation of the transmission 15, at starting of the vehicle.

In order to set the clutch in a state in which non-operative stroke is eliminated, the oil pressure at an upstream point (i.e., the oil line pressure which is required to maintain the clutch in a state in which non-operative stroke is eliminated) is set to be slightly higher than the oil pressure at the clutch in a state in which non-operative stroke is eliminated (non-operative stroke elimination pressure).

When the flag value of the idling stop flag is set to "0" at time t5, the vehicle speed V and the engine revolution rate NE gradually increase as shown in FIGS. 7A and 7B, as a result, the oil line pressure is also gradually increased as shown in FIGS. 7E and 7F, and the clutch pressure is increased by the control of the clutch.

At time t6 at which the oil line pressure measured by the oil pressure sensor 41 decreases to be equal to or greater than the predetermined operation-stop threshold value PED having hysteresis as shown in FIG. 7E, "0" is set to the flag value of the EOP operation flag which makes the motor-driven oil pump operate.

As a result, after time t6, the vehicle speed V and the engine revolution rate NE gradually increase as shown in FIGS. 7A and 7B, and then the oil line pressure is also gradually increased as shown in FIGS. 7E and 7F, and the clutch pressure is increased by the control of the clutch.

As explained above, according to the control device 10 for a vehicle of the present embodiment, even when the discharging pressure of the mechanical oil pump 16 driven by the internal combustion engine 11 is decreased because the internal combustion engine 11 is in the idling stopped state, the oil line pressure can be maintained at a predetermined level by the oil pressure provided by the motor-driven oil pump 17. By controlling the motor-driven oil pump 17 depending on the value of the idling stop flag which makes the internal combustion engine 11 stop, and depending on the oil line pressure measured by the oil pressure sensor 41, the oil pressure provided by the oil pressure providing section 18 can be maintained at an appropriate level while improving the operational efficiency of the motor-driven oil pump 17; therefore, degradation of the responsiveness of the vehicle at starting can be prevented. Moreover, by changing the operation state of the motor-driven oil pump 17 depending on the oil temperature TATF measured by the oil temperature sensor 42, accuracy of the oil pressure provided by the operation of the motor-driven oil pump 17 can be improved.

Note that, in the embodiment explained above, the vehicle in which the control device 10 for a vehicle is described as a hybrid vehicle; however, the vehicle is not limited to a hybrid vehicle, and may be a vehicle which is solely driven by the internal combustion engine 11. In other words, the present invention is applicable to a vehicle in which an internal combustion engine 11 is set in an idling stopped state when predetermined stop conditions are satisfied.

As explained above, according to the control device for a vehicle of the present invention, because the control section controls the operation of the motor-driven oil pump depending on the engine stopping command output from the engine stopping command output section and depending on the measured oil pressure output from the oil pressure measuring section, the oil pressure provided by the oil pressure providing section can be maintained to be an appropriate value while improving the operational efficiency of the motor-driven oil pump; therefore, degradation of the responsiveness of the vehicle at starting can be prevented, and the vehicle can be smoothly started.

According to another control device for a vehicle of the present invention, accuracy of the oil pressure provided by the operation of the motor-driven oil pump can be improved, and the oil pressure provided by the oil pressure providing section can be maintained to be an appropriate value while improving the efficiency of the motor-driven oil pump; therefore, degradation of the responsiveness of the vehicle at starting can be prevented, and the vehicle can be smoothly started.

According to another control device for a vehicle of the present invention, if compared with a control device which operates a motor-driven oil pump merely depending on an engine stopping command output from an engine stopping command output section, the oil pressure provided by the oil pressure providing section can be maintained to be an appropriate value while improving the efficiency of the motor-driven oil pump; therefore, degradation of the responsiveness of the vehicle at starting can be prevented, and the vehicle can be smoothly started.

According to another control device for a vehicle of the present invention, which is equivalent to oil pressure required to set the transmission in a state in which the input shaft and the output shaft is about to be connected, can be provided by the operation of the motor-driven oil pump even when the oil pump is stopped due to stop of the internal combustion engine; therefore, degradation of the responsiveness of the vehicle at starting can be prevented, and the vehicle can be smoothly started.

What is claimed is:

1. A control device for a vehicle comprising:
   a transmission which connects an input shaft connected to an internal combustion engine to an output shaft connected to driving wheels in such a manner that transmission gear ratio therebetween is changeable, and so as to transmit driving power of the internal combustion engine to the driving wheels;
   an oil pump driven by the internal combustion engine;
   a motor-driven oil pump which is provided independently from the oil pump, and which is driven by being supplied electrical power from an electrical power source;
   an oil pressure providing section which provides oil pressure for controllably operating the transmission by using operation oil supplied from the oil pump and motor-driven oil pump;
   an oil pressure measuring section for measuring the oil pressure provided by the oil pressure providing section;
   an engine stopping command output section for outputting an engine stopping command which makes the internal combustion engine stop upon predetermined stop conditions; and a control section for controlling the operation of the motor-driven oil pump depending on the engine stopping command output from the engine stopping command output section and depending on the measured oil pressure output from the oil pressure measuring section;

wherein the control section makes the motor-driven oil pump start when the measured oil pressure output from the oil pressure measuring section is equal to or smaller than a predetermined operation-starting threshold value after the engine stopping command is output from the engine stopping command output section; and wherein the control section controls the motor-driven oil pump so that the oil pressure measuring section outputs oil pressure greater than a predetermined oil pressure which is required to set the transmission in a state in which the input shaft and the output shaft is about to be connected.

2. A control device as claimed in claim 1, further comprising an oil temperature measuring section for measuring the temperature of the operation oil supplied from the oil pressure providing section, wherein the control section controls the operation of the motor-driven oil pump depending on the temperature of the operation oil output from the oil temperature measuring section.

3. A control device as claimed in claim 2, wherein the control section controls the operation of the motor-driven oil pump so that the revolution rate of the motor-driven oil pump is set to be higher as the temperature of the operation oil is higher.

4. A control device as claimed in claim 1, further comprising an engine starting command output section for outputting an engine starting command which makes the internal combustion engine start upon predetermined start conditions, wherein the control section makes the motor-driven oil pump stop when the measured oil pressure output from the oil pressure measuring section is equal to or greater than a predetermined stopping threshold value after the engine starting command is output from the engine starting command output section.

5. A control device as claimed in claim 1, wherein the transmission comprises a clutch which enables the gear change operation of the transmission, and which is operated by a hydraulic piston using the operation oil, and wherein the control section controls the motor-driven oil pump so as to eliminate non-operative stroke of the hydraulic piston.

6. A control device as claimed in claim 1, wherein the vehicle is a hybrid vehicle which comprises, in addition to the internal combustion engine, a motor for selectively driving the vehicle.

* * * * *